(12) United States Patent
DaSilveira

(10) Patent No.: US 6,863,031 B1
(45) Date of Patent: Mar. 8, 2005

(54) CAM OPERATED LATCH ASSEMBLY

(76) Inventor: John A. DaSilveira, 712 Industrial Blvd., Madisonville, TX (US) 77864

(*) Notice: Subject to any disclaimer, the term of this patent is extended or adjusted under 35 U.S.C. 154(b) by 0 days.

(21) Appl. No.: 10/719,917

(22) Filed: Nov. 21, 2003

(51) Int. Cl.[7] ................................................ A01K 15/04
(52) U.S. Cl. ...................................... 119/746; 119/745
(58) Field of Search ................................. 119/739, 744, 119/745, 746, 747, 748, 749, 750, 752, 743

(56) References Cited

U.S. PATENT DOCUMENTS

| | | |
|---|---|---|
| 549,965 A | 11/1895 | Howard |
| 1,021,576 A | 3/1912 | Dawson |
| 1,072,352 A | 9/1913 | Neller |
| 1,077,569 A | 11/1913 | Tarcza |
| 1,081,045 A | 12/1913 | James |
| 1,275,034 A | 8/1918 | Huxley |
| 1,286,441 A | 12/1918 | Stevenson |
| 1,360,941 A | 11/1920 | Hanson |
| 1,395,882 A | 11/1921 | Webb |
| 1,642,278 A | 9/1927 | Vanderlipp |
| 2,522,188 A | 9/1950 | Miller et al. |
| 3,152,577 A | 10/1964 | Sheriff |
| 3,397,432 A | 8/1968 | Banas |
| 4,037,566 A | 7/1977 | Albers |
| 4,051,813 A | 10/1977 | Albers |
| 4,055,149 A | 10/1977 | Haiges |
| 4,185,592 A | 1/1980 | Albers, Sr. |
| 4,314,528 A | 2/1982 | Fogleman |
| 4,377,131 A | 3/1983 | Vandenberg et al. |
| 4,457,265 A | 7/1984 | Anderson |
| 4,476,815 A | 10/1984 | Albers, Sr. |
| 4,495,897 A | 1/1985 | Albers, Sr. |
| RE32,728 E | 8/1988 | Albers, Sr. |
| 4,787,339 A | 11/1988 | Heizer, Jr. |
| 4,867,105 A | 9/1989 | Hatfield |
| 4,930,452 A | 6/1990 | DaSilveira |
| 4,976,224 A | 12/1990 | Hatfield |
| D326,340 S | 5/1992 | DaSilveira |
| RE34,232 E | 4/1993 | DaSilveira |
| 5,289,798 A | 3/1994 | Lock |
| 5,309,869 A | 5/1994 | Albers, Jr. |
| 6,352,052 B1 | 3/2002 | Albers, Jr. |

FOREIGN PATENT DOCUMENTS

| | | |
|---|---|---|
| FR | 2 423 979 | 4/1978 |
| SU | 1297774 | 8/1985 |

OTHER PUBLICATIONS

Photograph of Albers Accu–Lockttaken.

*Primary Examiner*—Teri P. Luu
*Assistant Examiner*—T. Nguyen
(74) *Attorney, Agent, or Firm*—Royston, Rayzor, Vickery & Williams, L.L.P.; William P. Glenn, Jr.

(57) ABSTRACT

An improved livestock latch assembly which includes a latch pin receiver assembly coupled to a rotatable camshaft, which moves the latch pin receiver assembly in a linear fashion between, deployed and retracted positions. In a deployed position, a latch pin receiver locks a pivotable restraining stanchion into a substantially vertical position when moved by an animal or operator. In a retracted position, a latch pin receiver assembly releases a pivotable restraining stanchion to freely pivot about its arc of swing. The improved latching mechanism may also include a decoupling member that allows a user to move a selected latch pin receiver assembly to a retracted position by uncoupling a selected latch pin receiver from a camshaft.

21 Claims, 5 Drawing Sheets

CAM OPERATED LATCH ASSEMBLY

DESCRIPTION

1. Technical Field

The present invention relates generally to latch assemblies for livestock stanchions. More specifically the present invention relates to latches for livestock stanchions that allow easy locking and releasing of animals from a frame.

2. Background Art

There exist a number of cattle stanchions that disclose an essentially co-planar frame of vertical posts and horizontal rails in combination with pivoting restraining stanchions to admit, restrain or manually release the heads of livestock. Typically, an animal is enticed to place its head through the frame to reach the food that is typically on the other side of the frame and low to the ground. As the animal lowers its head to reach the food, the neck generally comes into contact with a pivoting restraining stanchion thereby causing it to lock into a vertical position and containing the animal. The head and neck of the animal is free to move up and down but not sideways or backwards. Single and dual pivoting restraining stanchions fixed to a frame can be found in U.S. Pat. No. 5,178,096 issued to Lock (hereinafter Lock '096) and French Patent 2,423,979 issued to Batigne (hereinafter Batigne '979).

Most known locking mechanisms of prior art livestock stanchions utilize couplers, pulleys or sliding rails in combination with springs, clips, pegs or pins to releasably fix single or dual pivoting restraining stanchions in a vertical position. FIGS. 6 and 9 of Lock '096 reveal fixation and release of a pivotable restraining stanchion by a pivotable latch fixed to an upper rail. A nub fixed to a user rotated shaft makes contact with the pivotable latch to disengage the pivotable restraining stanchion thereby releasing the livestock from the frame. A similar configuration, but with two pivotable latches is shown in U.S. Pat. No. 5,289,798 issued to Lock (hereinafter Lock '798). FIGS. 2 and 3 of Batige '979 demonstrate a different type of latching mechanism for pivotable restraining stanchions. Like the Lock '979 and Lock '798 patents, nubs are fixed to a rotatable shaft. However, the pivotable latches are mounted on the pivoting restraining stanchions; and contact between a nub and corresponding pivotable latch fixes a pivoting restraining stanchion into a vertical position.

Livestock frames which use locking devices of springs and clips against a peg or pin are subjected to constant wear as the animal lowers and raises its head to feed. The tremendous force of the animal's neck exerted on the locking vertical stanchion bar(s) pulsate(s) these components to cause a chiseling effect which often shears a nub or pin. Even livestock frames that use sliding rails and couplers have the same problems. Such latching assemblies become worn resulting in dangerous defects that need constant maintenance and repair.

Furthermore, the components of existing latch assemblies may be subjected to harsh weather conditions such as ice, which may create or aggravate the defective conditions described above or cause components to seize in a particular position.

Aside from wear and exposure issues, latching assemblies of the prior art (disclosed above and known to those skilled in the art) present user safety issues. This is especially true when a user is required to release a pivotable restraining stanchion from its vertical locked position. Some locking devices actually require a user to place his/her fingers in close proximity to the load bearing surfaces and/or the path of moving components that make up the latch assembly. Such exposure is aggravated should an animal violently and/or suddenly move while a user's fingers are in such areas.

In view of the above described deficiencies and issues associated with existing latch mechanisms, the present invention has been developed to alleviate these drawbacks and provide further benefits to the user. These enhancements and benefits are described in greater detail herein below with respect to several alternative embodiments of the present invention.

SUMMARY OF INVENTION

The present invention in its several disclosed embodiments alleviates the drawbacks and deficiencies described above with respect to conventional latch mechanisms. The present invention incorporates several additionally beneficial features.

The improved latch assembly includes a latch pin receiver assembly coupled to a rotatable cam shaft which moves the latch pin receiver assembly in a linear fashion between deployed and retracted positions. In a deployed position, a latch pin receiver locks a pivotable restraining stanchion into a substantially vertical position when moved by an animal or operator. In a retracted position, the latch pin receiver assembly releases a pivotable restraining stanchion to freely pivot about its arc of swing. The improved latching mechanism may also include a decoupling member that allows a user to move a selected latch pin receiver assembly to a retracted position by uncoupling the selected latch pin receiver from the camshaft.

It is the general object of the present latching mechanism invention to provide a low maintenance animal actuated locking and user actuated unlocking latch assembly for use on livestock frames/stanchions.

It is another object of the present invention to provide a latch assembly by which individual animals may lock themselves into a frame when the latch assembly is in a locked position, but may not lock themselves into a frame/stanchion when the latch assembly is in an unlocked position.

It is still another object of the present invention to provide a latching mechanism with components protected from the elements.

It is yet another object of the present invention to provide a latch assembly for a livestock frame/stanchion by which a user may safely and simultaneously releases all animals or releases individual animals.

BRIEF DESCRIPTIONS OF THE DRAWINGS

The invention is described in greater detail in the following examples and with reference to the attached drawings, in which.

DETAILED DESCRIPTION OF THE INVENTION

GENERAL OVERVIEW: As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and function details disclosed herein are not be interpreted as limiting, but merely as a basis for the claims and as a representative basis for teaching one skilled in the art to variously employ in the present invention.

Figure 1:
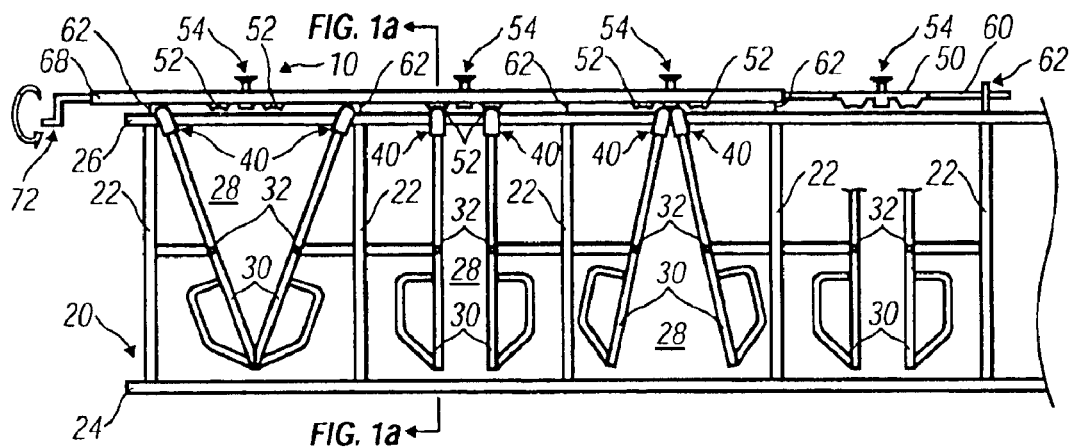
FIG. 1 is an elevation view of a frame with a cam operated latching mechanism showing restraining stanchions in various positions and a cutaway to reveal the cam and latching mechanism

The present invention is directed toward a livestock stanchion latching mechanism 10 that includes a latch pin receiver assembly 50 that releaseably locks a latch pin 42 fixed to a pivotable restraining stanchion 30. A restraining stanchion 30 is capable of pivoting about an arc that is coplanar with a frame 20. Frame 20 includes a livestock opening 28 formed by vertical posts 22 fixed between a substantially horizontal base rail 24 and a substantially horizontal slider rail 26 (See FIGS. 1, 2 and 3). It is contemplated that posts 22, base rail 24 and slider rail 26 are manufactured from metals, composite materials and/or a combination thereof with sufficient characteristics and dimensions to be wear resistant, restrain livestock and/or withstand harsh environments. It is further contemplated that the cross sections of posts 22, base rail 24 and slider rail 26 can be plate-like, circular, arcuate, square, rectangular, polygonal or a combination thereof. A preferred embodiment of a post 22 would be galvanized steel with a circular cross section. A preferred embodiment of a slider rail 26 would be galvanized steel with a rectangular cross section. A preferred embodiment of a base rail 24 would be galvanized steel with a rectangular cross section.

As depicted in FIGS. 1 through 6a, a restraining stanchion 30 is pivotally fixed to and coplanar with frame 20 within each livestock opening 28. In a preferred embodiment, two restraining stanchions 30 are positioned within a livestock opening 28 (See FIG. 1). In another embodiment, one restraining stanchion 30 is positioned within a livestock opening 28 (See FIGS. 2 and 3). Irrespective of the number of stanchions 30 within a livestock opening 28, each restraining stanchion is pivotally fixed to a frame 20 so that it tends to remain in an open position. A restraining stanchion 30 moves about a pivot point 32 which can be positioned near or at a restraining stanchion's mid-region (See FIG. 1) or at an end region (See FIGS. 2 and 3). A restraining stanchion 30 is configured to move about its pivot point 32 between an arc defined at one end by an entry position and an exit position at the other end. Both the entry and exit positions place a restraining stanchion in a diagonal orientation in a livestock opening. When a restraining stanchion 30 is in an entry position, an animal is able to move its head and a portion of its neck into or out of the upper portion of a livestock opening 28. When a restraining stanchion 30 is in an exit position, the animal is able to move its head and a portion of its neck into or out of the lower portion of a livestock opening 28. Between these first positions, a restraining stanchion 30 is locked into a substantially vertical position by a latching mechanism 10 (See FIGS. 1, 2 and 3). It is contemplated that restraining stanchion 30 is manufactured from metals, composite materials and/or a combination of both which has sufficient characteristics and dimensions to be wear resistant, restrain livestock and withstand harsh environments. It is further contemplated that the cross section of restraining stanchion 30 can be plate-like, circular, arcuate, square, rectangular, polygonal or a combination thereof. A preferred embodiment of the restraining stanchion 30 would be galvanized steel with a circular cross section.

Figures 1A, 2A:
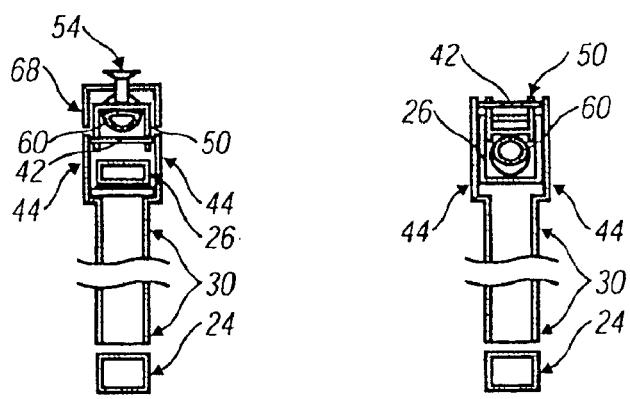
FIG. 1a is a cross section view of a frame with a cam operated latching mechanism.
FIG. 2a is a cross section view of a frame with a cam operated latching mechanism.

A head assembly 40 is fixed to an end region of a restraining stanchion 30 (See FIGS. 1 through 7a). A slide port 46 is formed in each head assembly 40 through which a slider rail 26 runs (See FIGS. 1a, 2a, 3a and 5a). In a preferred embodiment, a slide port 46 is formed by two cheeks 44 and a latch pin 42 (See FIGS. 1a, 2a and 4a). In an alternative embodiment of a head assembly 40, slide port 46 is formed by two cheeks 44 (See FIGS. 3a and 5a). As depicted in FIG. 3a, latch pin 42 can be fixed to a restraining stanchion distal to a head assembly 40. In a preferred embodiment, a latch pin 42 is fixed to a head assembly 40 that is fixed to the top of a restraining stanchion 30 (See FIGS. 1 and 2). It is contemplated that a head assembly 40 and latch pin 42 are manufactured from metals, composite materials and/or a combination of both which has sufficient characteristics and dimensions to be wear resistant, restrain livestock and withstand harsh environments. A preferred embodiment of the restraining head assembly 40 and latch pin 42 would be galvanized steel.

When an animal within a livestock opening 28 lowers its head to eat, a restraining stanchion 30 moves into a substantially vertical position thereby causing a latch pin 42 to releasably engage a deployed latch pin receiver assembly 50. Deployment and movement of a latch pin receiver assembly 50 is effected by a rotatable cam shaft 60 mounted by shaft supports 62 fixed to a frame 20 (See FIGS. 1, 2, 3, 4, 5, and 7 through 11). A camshaft 60 is rotated by a user-operated handle 72 or conventional motorized means.

A camshaft 60 can be formed with depressions 64 or lifters 66 at locations along its length (See FIGS. 8 through 11). It is contemplated that a latch pin receiver assembly 50, cam shaft 60, and lifter 66, and shaft support 62 are manufactured from metals, composite materials and/or a combination of both which has sufficient characteristics and dimensions to be wear resistant, restrain livestock and withstand harsh environments. A preferred embodiment of a latch pin receiver assembly 50 and a shaft support 62 would be galvanized steel. It is further contemplated that the cross section of a substantial portion of a camshaft 60 can be circular, arcuate, polygonal or a combination thereof. A preferred embodiment of a camshaft 60 would be galvanized steel with a circular cross section along a substantial portion of its length.

Figure 8:
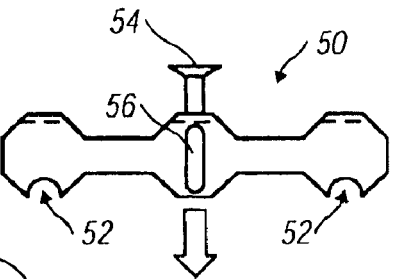
FIG. 8 is a detailed perspective view of a cam operated latching mechanism.
Figure 8:
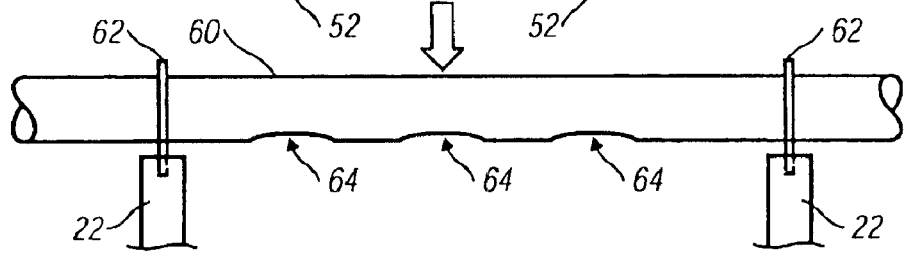
Figure 9:
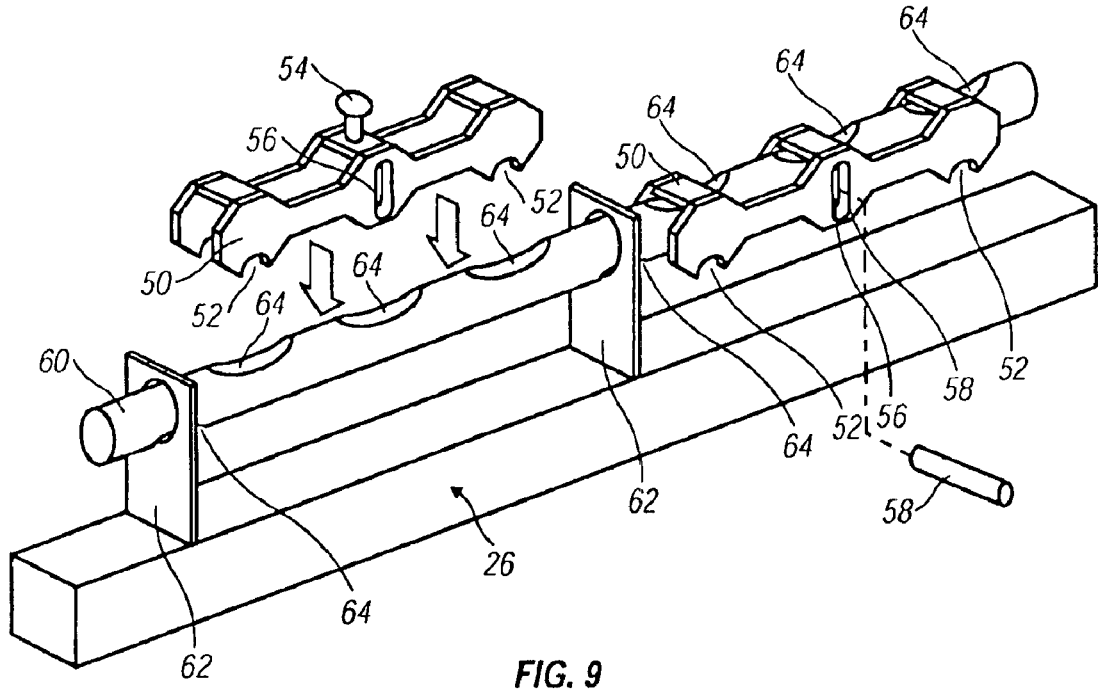
FIG. 9 is a detailed perspective view of a cam operated latching mechanism.
Figure 10:
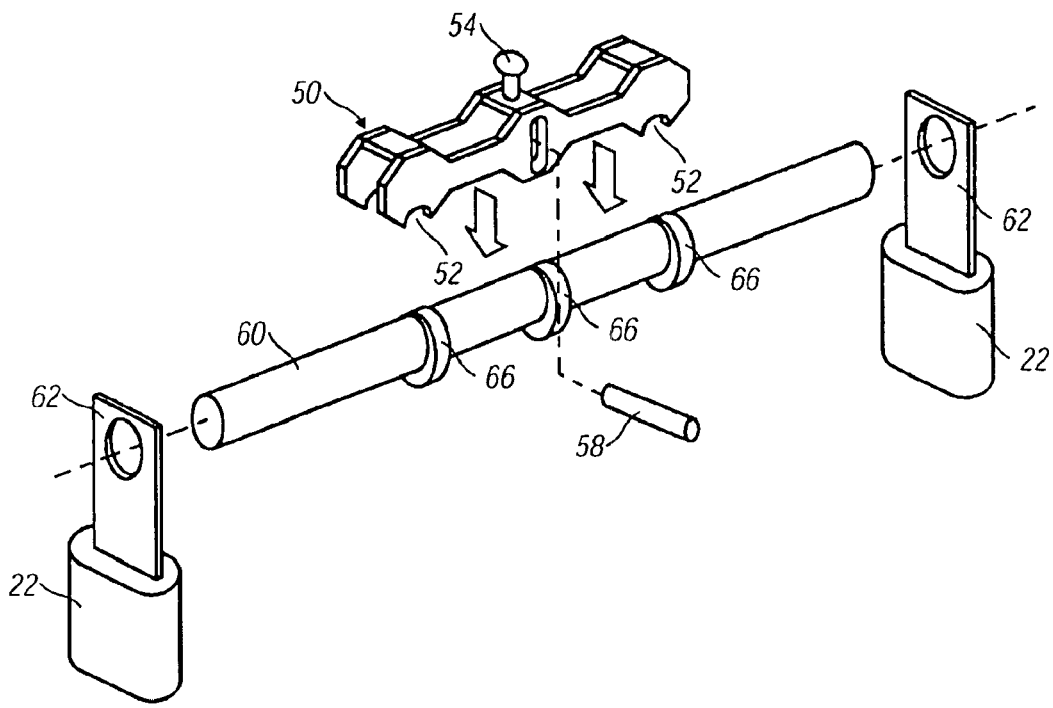
FIG. 10 is a detailed perspective view of a cam operated latching mechanism.
Figure 11:
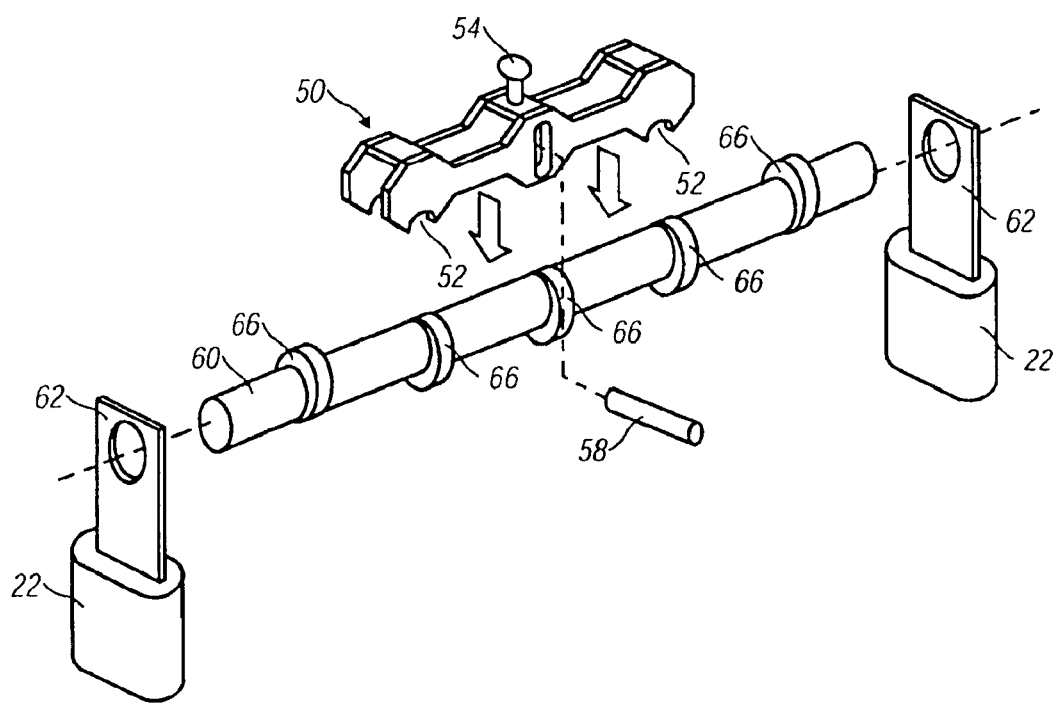
FIG. 11 is a detailed perspective view of a cam operated latching mechanism.

In one embodiment, as depicted in FIGS. 8 and 10, a latch pin receiver assembly 50 rides a camshaft 60 at the location of a depression 64 or lifter 66. In such an embodiment, a depression 64 and/or lifter 66 translates rotational movement of a cam shaft 60 into reciprocating movement of a latch pin receiver assembly 50 between a retracted position and a deployed position. In another embodiment (not shown), a latch pin receiver assembly 50 rides a camshaft 60 supported by shaft supports 66 in rotatable contact with depressions 54 or lifters 66. In such an embodiment, rotation of a camshaft 60 causes reciprocating movement of the camshaft 60 and a latch pin receiver assembly 50 between a retracted position and a deployed position. In a preferred embodiment, a camshaft 60 is formed with depressions 64 and/or lifters 66 at locations where latch pin assemblies 50 ride as well as where a camshaft 60 is supported by shaft supports 62 (See FIGS. 9 and 11). The extension of a latch pin receiver assembly 50 between a retracted and deployed position is greater with depressions 64 and/or lifters 66 at both locations than similar sized depressions 64 and/or lifters 66 at only one of the above-described locations.

A latch pin receiver assembly 50 is fixed to either a shield 68 (or slider rail 26 when fixed inside a slider rail) by a slide pin 58 which passes through a slide guide 56 formed in the latch pin receiver assembly 50 (See FIG. 8 through 11). The length of a slide guide 56 must be sufficient to allow a latch pin receiver assembly 50 to move freely between a deployed and retracted position.

Figure 2:
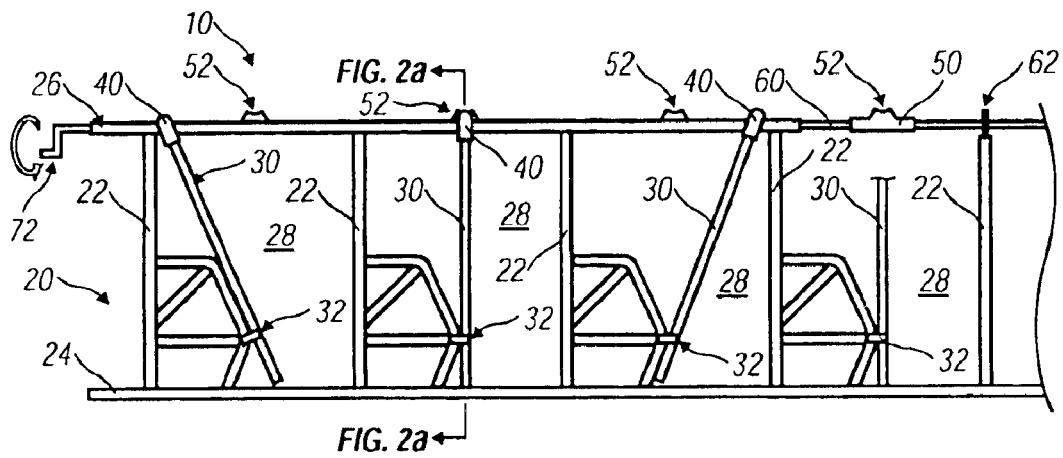
FIG. 2 is an elevation view of a frame with a cam operated latching mechanism showing restraining stanchions in various positions and a cutaway to reveal the cam and latching mechanism.
Figure 3:
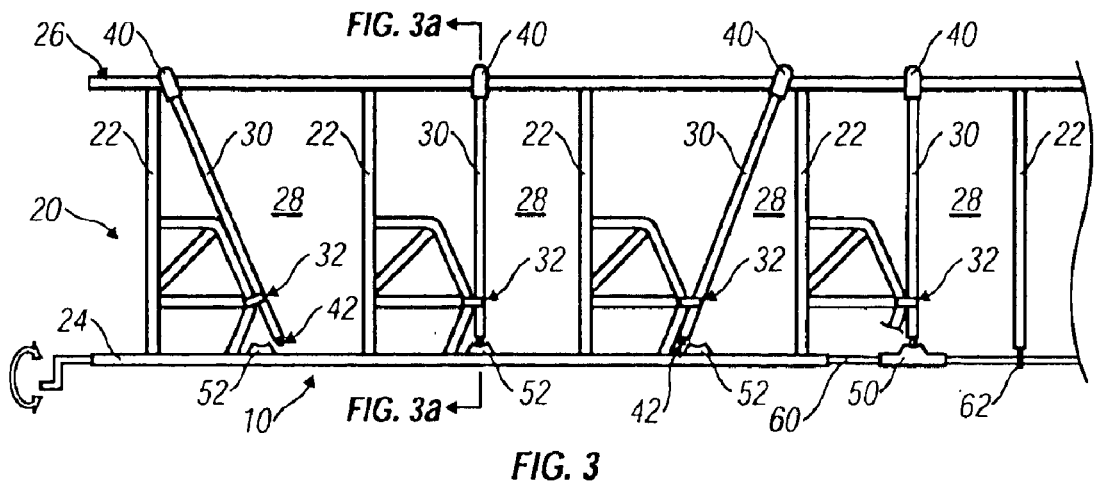
FIG. 3 is an elevation view of a frame with a cam operated latching mechanism showing restraining stanchions in various positions and a cutaway to reveal the am and latching mechanism.
Figures 3A, 4A:
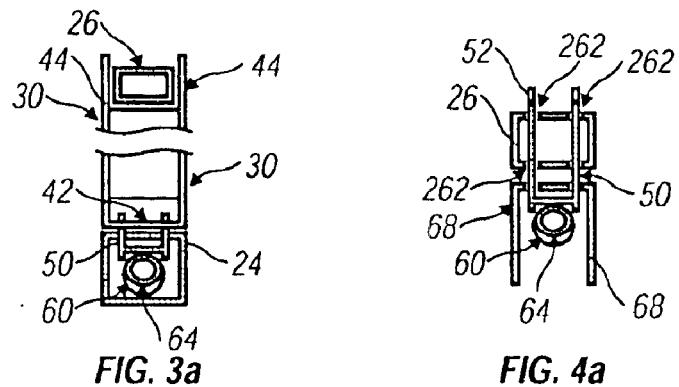
FIG. 3a is a cross section view of a frame with a cam operated latching mechanism.
FIG. 4a is a detailed cross sectional view of a cam operated latching assembly.
Figure 4:
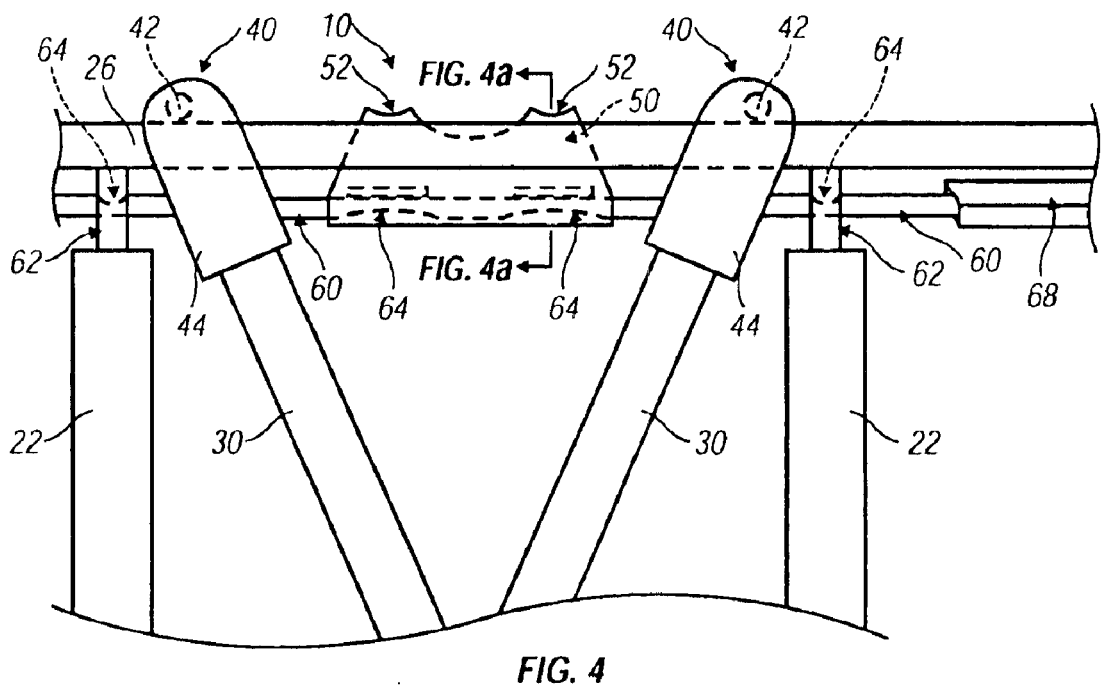
FIG. 4 is a detailed elevation view of a frame with a cam operated latching assembly.
Figure 5:
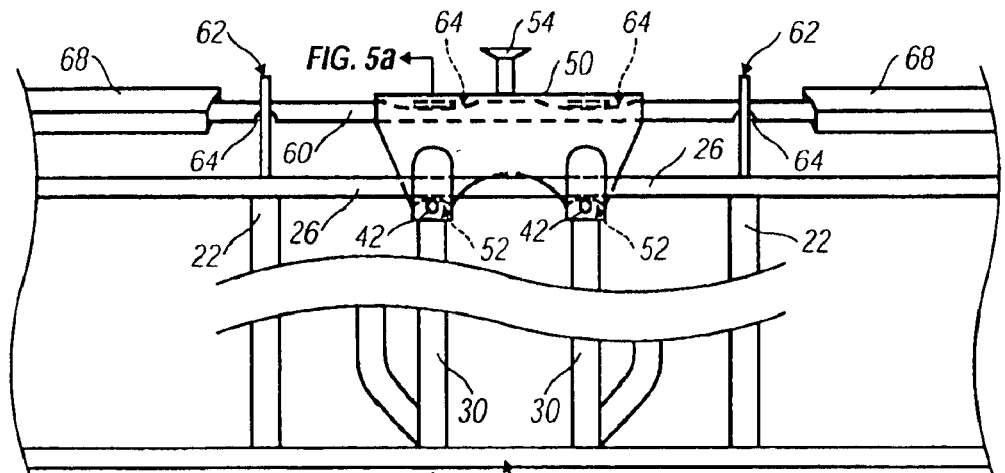
FIG. 5 is a detailed cut away elevation view of a cam operated latching assembly.
Figure 5A:
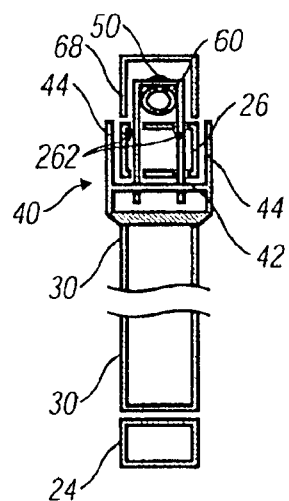
FIG. 5a is a detailed cross sectional view of a cam operated latching assembly.
Figure 6A:
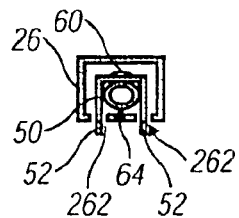
FIG. 6a is a detailed cross section view of a cam operated latching mechanism.
Figure 6:
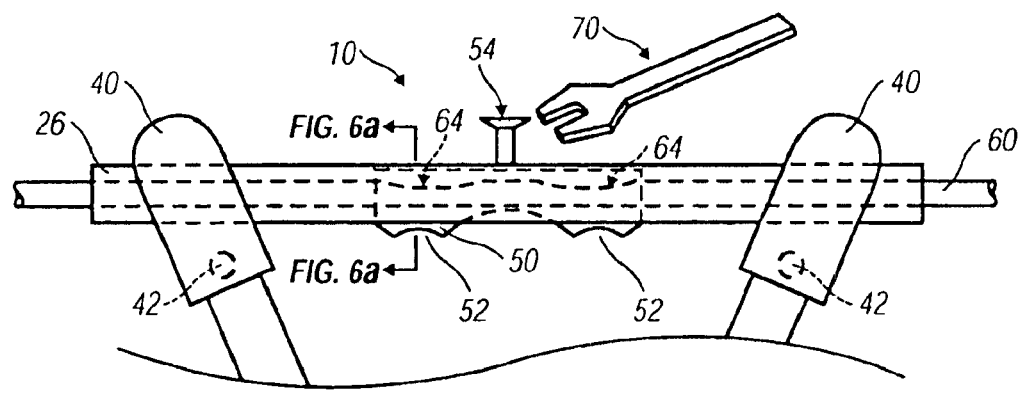
FIG. 6 is a detailed elevation view of a frame with a cam operated latching mechanism.
Figure 7:
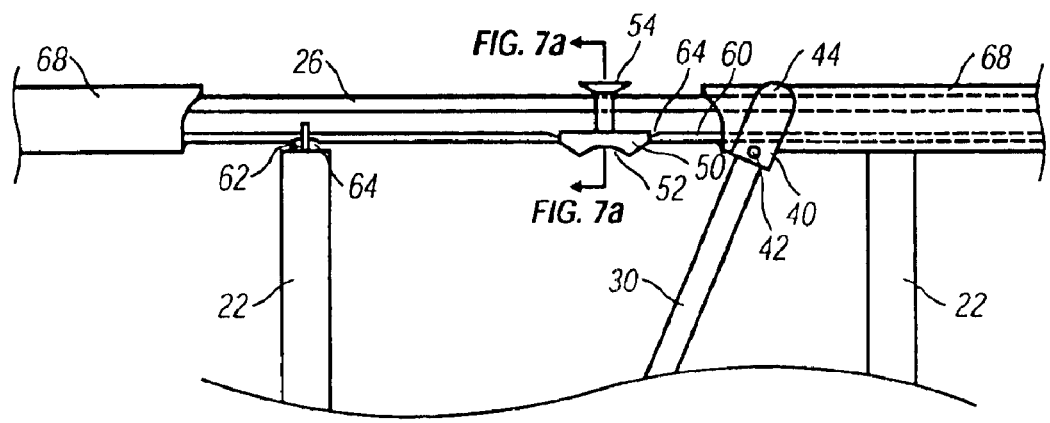
FIG. 7 is a detailed cut away view of a cam operated latching mechanism.
Figure 7A:
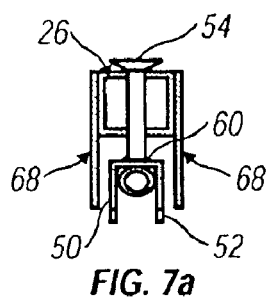
FIG. 7a is a detailed cross sectional view of a cam operated latching mechanism.

It is contemplated that a receiver 52 formed in a latch pin receiver assembly 50 can be pointed down (FIGS. 1, 5, 6 and 7 through 11) or up (FIGS. 2, 3 and 4). It is further contemplated that a camshaft 60 can be rotatably mounted adjacent to a slider rail 26 with a camshaft 60 above slider rail 26 (See FIGS. 1, 1a, 5 and 5a) or a camshaft below slider rail 26 (See FIGS. 3, 3a, 4, 4a, 7 and 7a). Likewise, a camshaft 60 can be rotatably mounted within a slider rail 26 as depicted in FIGS. 2, 2a, 3, 3a, 6 and 6a. Where a camshaft 60 is rotatably mounted within a slider rail 26 or a slider rail 26 is interposed between a camshaft 60 and a latch pin 42, member openings 262 are formed in a slider rail 26 to allow a receiver member 52 to move to/from a deployed position (See FIGS. 3 through 6a). It is contemplated that the latching assemblies 10 described above can be located at the bottom of a frame 20 similar to that shown in FIGS. 3 and 3a but with the base rail 24 above a slider rail 26.

Irrespective of the location of the latching assembly 10 with respect to the frame, once the latch pin receiver assembly 50 is moved into a retracted position by a cam shaft 60, latch pin 42 is disengaged thereby allowing the corresponding restraining stanchion 30 to pivot freely within a livestock opening 28. Likewise, if a user pulls on a decoupling member 54 attached to a latch pin receiver assembly 50, the latch pin receiver assembly 50 will move to its retracted position, thereby allowing the corresponding restraining stanchion 30 to pivot freely within a livestock opening. It is contemplated that a decoupling member 54 be configured to allow a user to retract a latch pin receiver assembly 50 with his/her hand or an extension bar 70 (See FIG. 1). The use of a decoupling member 54 allows a user to selectively disengage a restraining stanchion 30 without disturbing other locked restraining stanchions 30. This can be useful if an animal is in distress and needs to be released.

A cam operated latch assembly and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. A livestock stanchion latching mechanism comprising:
    a plurality of substantially vertical posts fixed between a substantially horizontal base rail and a substantially horizontal slider rail to form a frame having a series of livestock openings between said posts;
    a restraining stanchion pivotally fixed to and co-planar with said frame within each of said openings, each of said restraining stanchions pivots between first positions in which said restraining stanchion presents a diagonal orientation in a said opening and a second position in which said restraining stanchion presents a substantially vertical orientation in a said opening;
    a latch head fixed to an end region of restraining stanchion;
    a latch pin fixed to said restraining stanchion, said latch pin releaseably connects to a latch pin receiver assembly, said latch pin receiver assembly coupled to a rotatable cam shaft mounted to said frame, wherein said cam shaft is rotated to move said latch pin receiver assembly between a deployed position to engage said latch pin thereby locking said restraining stanchion into said second position and a retracted position to release said latch pin.

2. A livestock stanchion latching mechanism as claimed in claim 1, wherein said slider rail is positioned between said latch pin and said end region of said restraining stanchion.

3. A livestock stanchion latching mechanism as claimed in claim 2, wherein said camshaft is mounted to said frame distal to said slider rail.

4. A livestock stanchion latching mechanism as claimed in claim 3, wherein said slider rail is above said base rail.

5. A livestock stanchion latching mechanism as claimed in claim 3, wherein said slider rail is below said base rail.

6. A livestock stanchion latching mechanism as claimed in claim 2, wherein said cam shaft is mounted within said slider rail, said slider rail having ports through which said latch pin receiver assembly may pass as said cam shaft is rotated.

7. A livestock stanchion latching mechanism as claimed in claim 6, wherein said slider rail is above said base rail.

8. A livestock stanchion latching mechanism as claimed in claim 6, wherein said slider rail is below said base rail.

9. A livestock stanchion latching mechanism as claimed in claim 2, wherein said camshaft is mounted to said frame between said slider rail and said end region.

10. A livestock stanchion latching mechanism as claimed in claim 9, wherein said slider rail is above said base rail.

11. A livestock stanchion latching mechanism as claimed in claim 9, wherein said slider rail is below said base rail.

12. A livestock stanchion latching mechanism as claimed in claim 1, wherein said latch pin is positioned between said slider rail and said end region of said restraining stanchion.

13. A livestock stanchion latching mechanism as claimed in claim 12, wherein said camshaft is mounted to said frame distal to said slider rail.

14. A livestock stanchion latching mechanism as claimed in claim 13, wherein said slider rail is above said base rail.

15. A livestock stanchion latching mechanism as claimed in claim 13, wherein said slider rail is below said base rail.

16. A livestock stanchion latching mechanism as claimed in claim 12, wherein said cam shaft is mounted within said slider rail, said slider rail having ports through which said latch pin receiver assembly may pass as said cam shaft is rotated.

17. A livestock stanchion latching mechanism as claimed in claim 16, wherein said slider rail is above said base rail.

18. A livestock stanchion latching mechanism as claimed in claim 16, wherein said slider rail is below said base rail.

19. A livestock stanchion latching mechanism as claimed in claim 12, wherein said camshaft is mounted to said frame between said slider rail and said end region.

20. A livestock stanchion latching mechanism as claimed in claim 19, wherein said slider rail is above said base rail.

21. A livestock stanchion latching mechanism as claimed in claim 19, wherein said slider rail is below said base rail.

* * * * *